Sept. 15, 1959 R. W. CREAMER 2,904,355
PRESSURE RESPONSIVE, ORIENTATED, DOUBLE
SEAL RING THREADED JOINT
Filed Nov. 9, 1955

INVENTOR.
R. W. Creamer
BY
ATTORNEY

United States Patent Office 2,904,355
Patented Sept. 15, 1959

2,904,355

PRESSURE RESPONSIVE, ORIENTATED, DOUBLE SEAL RING THREADED JOINT

Robert W. Creamer, Tulsa, Okla., assignor to Creamer and Dunlap, Tulsa, Okla., a partnership Application November 9, 1955, Serial No. 545,988

2 Claims. (Cl. 285—113)

This invention relates to sealing means and more particularly, but not by way of limitation, to sealing means for valve fittings and fittings of all types utilized in high pressure vapor systems of hydrocarbons, and the like. The present invention is an improvement over my copending application Serial No. 439,097, filed on June 24, 1954 and now abandoned.

In storage of certain vapors or gases under high pressure, such as liquefied petroleum gas, or ammonia, considerable difficulty has been experienced in sealing the fittings for the valves, gauges and the like due to the expansion and contraction of the gases under variable weather conditions which causes creeping of the engaged threaded members of the fittings. An efficient vapor seal is difficult to maintain and as a result, the threaded members of the fittings are set up with pipe dope and other compounds which have a very detrimental effect on valve seats, inlet and outlet orifices, pilot lights and the like, particularly in liquefied petroleum gas and ammonia systems. In the present day commercial fittings for such systems, special types of threads are also utilized with the thread dope in order to obtain the necessary mechanical tightness and sealing in order to prevent vapor losses. Furthemore, it is often necessary to provide for additional "take-up" or tightening of the threaded portions of a valve, or the like, in order that the valve may be rotated to the position required for opening thereof. Therefore, it is desirable to provide a sealing means for efficiently sealing the threaded joint in a manner which permits a proper orientation of the valve within the shell of the storage vessel.

The present invention is generally concerned with a sealing means utilized with threaded fittings for stored liquefied petroleum gases or ammonia systems wherein an efficient vapor pressure seal is maintained regardless of expansion or contraction of vapors stored in the tank normally causing creeping of threaded members, and without the use of detrimental thread dope compounds and particularly under high pressure conditions where the seal is more effective as the pressure increases. The novel sealing means provides an efficient seal at the joint in a manner which permits a three hundred and sixty degree rotation of the fitting within the threaded opening in the shell of the vessel, thereby permitting orientation of the fitting as desired for efficient utilization thereof.

It is an important object of this invention to provide a sealing means for threaded fittings of a high pressure vapor storage tank where the seal becomes more effective as the pressure increases.

It is another object of this invention to provide an effective sealing means for threaded fittings of a high pressure vapor storage tank whereby the fitting may be orientated with respect to the tank as required for efficient utilization thereof.

And still another object of this invention is to provide and effective sealing for the threaded fittings utilized in high pressure gas storage tanks where the threads may be any commercially available threads and without using any pipe dope or compound in conjunction therewith.

Another object of this invention is to provide an effective sealing of the threaded fittings for high pressure gas systems wherein the fittings are set up with an efficient seal without any excess torque thereon, and which maintains an efficient vapor seal under variable weather conditions tending to cause expansion or contraction of the stored gases.

And still another object of this invention is to provide an O-ring sealing means for threaded fittings of high pressure gaseous systems adapted to be compressed into a substantially triangular configuration to provide multiple points of sealing contact, so that as the pressure increases the configuration of the ring is such to move it into a decreasing space, thereby increasing the sealing contact.

Another object of this invention is to provide an O-ring sealing means for vapor pressure fittings which is durable and efficient in operation and capable of easy replacement without impairment to the fittings.

Other objects and advantages of the invention will be evident from the following detailed description, read in conjunction with the accompanying drawings, which illustrate my invention.

Figure 1:
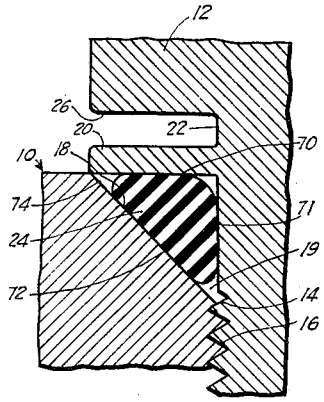
Figure 1 is a detail sectional view of cooperating male and female threaded members in one position of sealing before orientation of the threaded members.

Referring to the drawings in detail, reference character 10 refers to a female fitting for a storage tank (not shown) normally utilized for the storage of liquefied petroleum gases, hydrocarbons, ammonia or other types of vapors usually maintained under high pressure conditions. A plurality of the fittings 10 are preferably provided on the top, but not limited thereto, of the storage tank for receiving valves, gauges and the like normally utilized in vapor pressure systems of this type. In order to prevent leakage of the high pressure gases from the tank, it is necessary that the fittings 10 are maintained with a very efficient seal since variable weather conditions cause expansion and contraction of the gases within the tank, and as a consequence, a considerable amount of creeping or movement of the threaded members of the fittings occurs whereby the seal is usually broken and vapor is lost therethrough. In high pressure hydrocarbon systems, such as LPG, ammonia, and the like, the use of chemicals or thread dope has a detrimental corrosive effect on the openings of the valve connections and gauges, causing them to eventually become inoperative.

Figure 2:
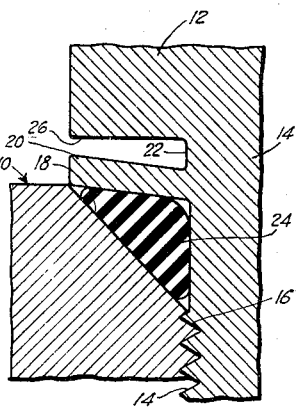
Figure 2 is a view similar to Fig. 1 depicting the threaded members in a position of sealing after orientation of the male threaded member with respect to the female threaded member.

Figures 1 and 2 show a body member 12 forming part of a valve or gauge unit (not shown) and the member 12 has a male thread connection 14 threadedly inserted in the female threaded portion 16 of the fitting 10. The tank fitting 10 is provided with a chamfered or beveled recess 18 of any suitable angular disposition between thirty and sixty degrees. The valve body member 12 is provided with an outwardly extending flange portion 20 spaced from the member 12 to provide a slotted portion 22 immediately thereabove for a purpose as will be hereinafter set forth. An O-ring sealing member 24 of a diameter substantially corresponding to the outer diameter of the threaded member 14 is disposed in the recess 18 below the flange member 20 in order to effect an efficient seal between the threaded fittings. As clearly shown in the drawings, the O-ring 24 is deformed into a substantially triangular configuration for a purpose as will be hereinafter set forth. The deformation of the O-ring 24 is caused by the threading action of the male threads 14 with the female threads 16 of the fitting 10. The flange member 20 of the valve body 12 contacts the O-ring during threaded engagement of the two members 10 and 12, as particularly shown in Fig. 1, and the flange 20 bears against the O-ring for confinement within the triangular space of the recess 18 which causes a distortion of the O-ring 24 as shown in the drawings. Prior to contact by the flange 20 the recess 18 supports the ring 24 in a manner so that approximately one-thirty-second to one-sixteenth of an inch of the O-ring is disposed above the recess 18. In engagement between the threaded members 10 and 12, the flange portion 20 will first make contact with the upstanding ring portion prior to full engagement of the threaded portions 14 and 16, and in this manner will start the initial deformation of the O-ring within the triangular recess or slot 18.

Continued threading between the male and female members will further deform the O-ring 24 in the slot 18 into the substantially triangular configuration as shown. It will thus be seen that the radial dimensions of the O-ring are slightly larger than the depth dimensions of the beveled recess 18 and upon a complete threaded engagement between the male and female members, the flange 20 forms a closed wall of the triangular shaped sealing chamber 19. In the embodiment of the invention as shown in Figs. 1 and 2, a sealing position of the O-ring 24 within the chamber 19 is reached before the threaded members 14 and 16 are in a full threaded position, as particularly shown in Fig. 1. At least one thread of the threaded portion 14 extends above the threaded portion 16. The width of the slot 22 is at least equal to the width of one pitch of the threads 14 and 16, but is not limited thereto. It may be slightly more than the width of one pitch, if desired. In this manner at least one complete revolution or three hundred sixty degrees rotation of the valve body 12 may be made after sealing contact is obtained in order to orientate the valve body with respect to the fitting 10, or tank, as is required for efficient utilization of the valve. During an orientation of the valve member 12 within the fitting, the flange member 20 may be bent slightly upwardly. The slot 22 permits this bending of the flange 20 as is clearly shown in Fig. 2. Furthermore, the flange may be bent into an engagement (not shown) with the shoulder 26 of the valve body 12 and will thus function as a lock washer to securely retain the valve body 12 within the fitting 10. It will be apparent from Figs. 1 and 2 that the outer end of the flange 20 engages the top flat surface of the fitting 10 conterminous with the top of the recess 18. Consequently, as the threaded engagement continues, the flange 20 is caused to be bent in the manner above set forth, while simultaneously maintaining a downward thrust or force against the distorted O-ring 24. It will be apparent that the dimensional thickness of the flange 20 and the depth of the slot 22 determines the torque necessary to properly orient the fitting 12 after a hand tight or partial makeup engagement of the threads has been made. Consequently, variations in the dimensional structure of the flange 20 and the depth of the slot 22 will cause variations in the torque required for orientation.

Figure 3:
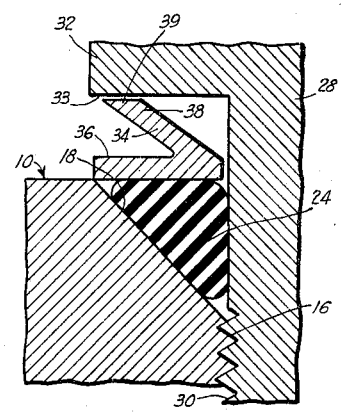
Figure 3 is a detail sectional view of a modification depicting the sealing means and threaded members in one position of sealing before orientation of the threaded members.
Figure 4:
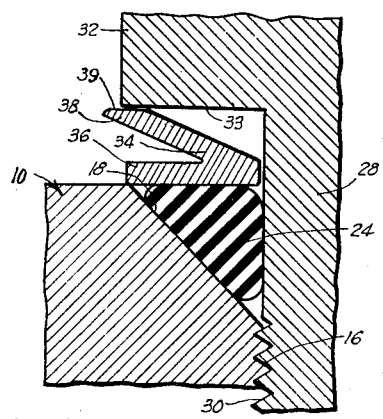
Figure 4 is a view similar to Fig. 3 depicting the sealing means in a sealing position after orientation of the male threaded member with respect to the female threaded member.

In Figs. 3 and 4, a modified threaded connection is shown wherein a valve body 28 is provided with a male threaded portion 30 for threaded insertion within the female threaded portion 16 of the fitting 10. The valve body 28 is further provided with an outwardly extending shoulder portion 32 for bearing against a washer member 34 of substantially V-shaped configuration in section. The horizontal leg 36 of the washer 34 bears against the O-ring 24 in a manner similar to the flange 20 of the preferred embodiment, as hereinbefore set forth, consequently upon a make-up engagement of the threaded members, a sealed position of the O-ring 24 within the recessed portion 18 is obtained prior to a full engagement of the threaded connection. In obtaining a sealed engagement of the O-ring 24, at least one thread of the male threaded member 30 extends above the female threaded portion 16. In this manner, one full revolution, or three hundred sixty degrees rotation, is provided for orientation of the valve body 28 with respect to the fitting 10. The washer 34 is provided with an angularly disposed leg portion 38 having a flat upper face 39 adapted to bear against the lower machine face 33 of the shoulder 32. In a partial threaded engagement between the members 10 and 28 which may be sufficient to distort the O-ring 24 by the leg member 36, there is substantially no bending or flexing of the angle leg 38. However, when it is desired to orient the fitting 28 by a further rotation thereof, the angle leg 38 will be bent slightly downward, thereby permitting the orientation of the member 28 without lessening of the downward thrust or force of the horizontal leg portion 36 bearing against the top of the O-ring 24. In this manner it will be seen that the washer 34 not only assists in distorting the O-ring 24, but acts as a lock washer through the angle leg portion 38 for preventing retrograde movement of the fitting 28 when in threaded engagement.

Figure 5:
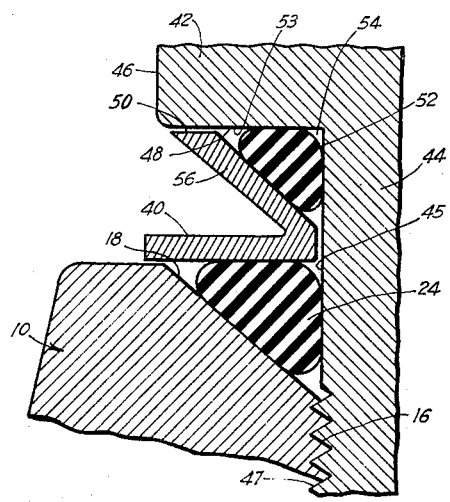
Figure 5 is a sectional view similar to Fig. 3 but modified to provide a double sealed threaded joint embodying the invention.
Figure 6:
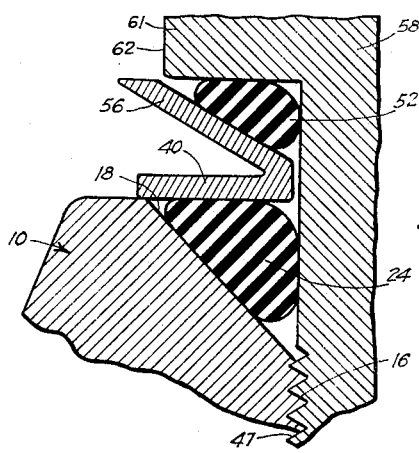
Figure 6 is a view similar to Fig. 5 depicting a double sealed threaded connection in still another modified use.

In Fig. 5 is depicted a washer 40 of a similar configuration to the washer 34 for depressing or distorting the O-ring 24 in the chamfered recess 18 between the fitting 10 and a fitting 42. In order to substantially eliminate any possibility of leakage along the periphery 45 of the shank 44, a second O-ring type seal 52 is provided in the angular portion 54 and the upper face of the angle leg 56 of the washer 40. The top portion of the leg 56 is provided with a flat surface 50 cooperating with a flat surface 48 of the fitting 42. In this manner as the threads 16 of the fitting 10 are engaged with the threads 47 of the shank 44, the washer 40 presses the O-ring 24 downwardly to provide a sealing engagement between the fittings. In the orientation operation, a continued rotation between the fittings will increase the threaded engagement and cause a slight bending of the angle leg member 56 of the washer 40 with a distortion of the O-ring 52 within the chamfer 53, thereby providing a substantially triangular distortion of the O-ring and a double seal arrangement between the fittings 42 and 10. The upper surface 50 of the leg 56 is shown cooperating with a symmetrical type flange 46 and with no irregularities in shape. However, in Fig. 6 there is shown a slight modification of the dual sealing structure where it is utilized with a fitting 58 having an extending flange portion 61 which is of irregular shape as distinguished from cylindrical, such as square or polygonal shaped flange 61. In such instances, the angle leg 56 of the washer 40 will extend beyond the outer periphery 62 of the flange 61 at various circumferential points of the flange 61. However, the operation of the dual sealing for both the O-ring 24 and the upper ring 52 are the same as that for the embodiment depicted in Fig. 5. The slight flexing or bending of the angle leg 56 of the washer 40 permits the orientation of the washer as well as provides a distortion of the second sealing O-ring 52.

The deformation of the substantially annular O-ring into a substantially triangular configuration provides a more efficient sealing between threaded members because of the provision of multiple points of sealing contact. Sealing contact is made at points 70, 71 and 72 (Fig. 1), although only the contact at 70 and 71 is necessary to provide efficient sealing. In the present type of O-ring seal utilized for high pressure gaseous systems, it will be apparent that any leakage pressure of the high pressure vapors acting against the deformed seal will have the effect of tightening the seal, since the pressure would tend to move it into the decreased space 74 (Fig. 1). The triangular deformation of the O-ring seal permits a greater tolerance of eccentricity between the threaded members 14 and 16 as shown in Figs. 1 and 2, since the circular threaded members may be off center as much as one-sixteenth of an inch for an inch diameter and still permit threaded engagement between the members without distorting or causing any inefficiency in the sealing of the O-ring member 24. This is mainly due to the flexibility of the ring and the triangular configuration permitting slight movement of the O-ring off center one way or the other. It has been found under field conditions that this greater tolerance has many advantages, in that it will permit finger tight threading and an efficient seal of two engaging bodies without the necessity of having to re-run, or chase the threads to overcome the slightly off center position.

The O-rings 24 and 52 are preferably made of any suitable type rubber or like composition having elastic and resilient characteristics, but is not limited thereto, and may be made of aluminum, copper, bronze, or any metal composition of sufficient pliability to effect the deformation of the O-ring into the triangular configuration of the recess. It has been found that the deformed O-ring seal provides sufficient vapor sealing, and security of mechanical tightness may be obtained by frictional contact of the flange member 20 or the washer members 34 and 40 with the shouldered portion of the valve body, as shown in the drawings.

From the foregoing, it will be apparent that the present invention contemplates a novel sealing means for providing an efficient vapor pressure seal in threaded fittings utilized in the storage of high pressure vapor or gases wherein an O-ring seal is distorted into a triangular configuration in a manner to cause a more effective and tighter vapor seal between engaging threaded members if any pressure leak develops thereagainst. Furthermore, the sealing means provides an efficient sealing of the threaded connection in a manner to permit an orientation of the fittings as required for utilization thereof.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A sealed fitting for use with storage tanks containing high pressure vapors, and comprising a threaded apertured boss for receiving the one piece threaded stud of a fitting therein, a flared recess provided in the boss conterminous with the threaded aperture, a washer member of substantially V-shaped configuration provided on the stud member, said washer having a horizontally disposed leg and an angularly disposed leg, a resilient annular seal member of circular cross-sectional configuration disposed in the recess, said seal member having an upper portion extending above the recess, said horizontally disposed leg of the washer cooperating with the recess upon one position of threaded engagement of the boss and stud members to provide an annular chamber of substantially triangular shaped cross-section, said seal member being deformed into the shape of the chamber to provide a sealed engagement of the seal with the threaded stud member and the horizontally disposed leg of the washer member, said angular disposd leg engaging the lower face of the stud to provide a second substantially triangular shaped chamber therebetween, a second resilient seal member disposed in the second chamber and providing sealing engagement between the stud and the washer, a groove between the washer and the angular leg permitting a bending of the angular leg with a continued threading of the stud into the apertured boss to permit orientation of the stud and boss members of the fitting.

2. A sealed fitting for use with storage tanks containing high pressure vapors, and comprising a threaded apertured boss for receiving the threaded stud of a tank fitting therein, a tapered recess provided in the boss conterminous with the threaded aperture, a washer member of substantially V-shaped configuration provided on the stud member and spaced from the threaded portion thereof, said washer having a substantially horizontally disposed leg and an angularly disposed leg, a resilient annular seal member of circular cross-sectional configuration disposed in the recess, said seal member having an upper portion extending above the recess, said horizontally disposed leg of the washer member cooperating with the recess upon one position of threaded engagement of the boss and stud members to provide a closed annular chamber of substantially triangular shaped cross-section, said angularly disposed leg of the washer member further cooperating with the stud member to provide a second sealed substantially triangular shaped chamber, a second circular seal member disposed within the second chamber, both of said seal members being deformed into the triangular shape of the chamber to provide a sealed engagement of the seals with the threaded stud member and the washer member, said V-shaped configuration of the washer providing for an angular contraction thereof in another position of threaded engagement of the stud and boss members to provide for orientation therebetween.

References Cited in the file of this patent

UNITED STATES PATENTS

| | | |
|---|---|---|
| 2,343,235 | Bashark | Feb. 29, 1944 |
| 2,437,632 | Wolfram | Mar. 9, 1948 |
| 2,441,344 | Bosworth | May 11, 1948 |
| 2,458,817 | Wolfram | Jan. 11, 1949 |
| 2,474,319 | Muller | June 28, 1949 |
| 2,476,074 | Unger | July 12, 1949 |
| 2,476,561 | Pedersen | July 19, 1949 |
| 2,523,585 | Mueller et al. | Sept. 26, 1950 |
| 2,533,059 | Shaffer | Dec. 5, 1950 |
| 2,704,676 | Harding | Mar. 22, 1955 |
| 2,759,743 | Bloom | Aug. 21, 1956 |

FOREIGN PATENTS

| | | |
|---|---|---|
| 276,786 | Great Britain | Sept. 8, 1927 |
| 732,901 | France | June 27, 1932 |
| 198,232 | Switzerland | Sept. 1, 1938 |